(12) United States Patent
Williams et al.

(10) Patent No.: US 10,259,348 B2
(45) Date of Patent: Apr. 16, 2019

(54) SWAY CONTROL FOR SUSPENDED FURNITURE IN A VEHICLE

(71) Applicant: Toyota Motor Engineering & Manufacturing North America, Inc., Erlanger, KY (US)

(72) Inventors: Paxton S. Williams, Milan, MI (US); Danil V. Prokhorov, Canton, MI (US); Richard M. Sullivan, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 76 days.

(21) Appl. No.: 15/639,629

(22) Filed: Jun. 30, 2017

(65) Prior Publication Data

US 2019/0001844 A1    Jan. 3, 2019

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60N 2/16* | (2006.01) |
| *B60N 2/10* | (2006.01) |
| *B60N 2/005* | (2006.01) |

(52) U.S. Cl.
CPC ........... *B60N 2/1695* (2013.01); *B60N 2/005* (2013.01); *B60N 2/10* (2013.01)

(58) Field of Classification Search
CPC ......... B60N 2/1695; B60N 2/005; B60N 2/10
See application file for complete search history.

(56) References Cited

U.S. PATENT DOCUMENTS

| | | | |
|---|---|---|---|
| 3,760,436 A | 9/1973 | Zach et al. | |
| 4,144,601 A | 3/1979 | Anderson et al. | |
| 5,203,600 A * | 4/1993 | Watanabe | B60N 2/4221 296/68.1 |
| 5,638,560 A | 6/1997 | Rigdon et al. | |
| 6,671,901 B2 | 1/2004 | Zenczykowski | |
| 6,993,798 B1 | 2/2006 | Roberts | |
| 7,146,662 B1 | 12/2006 | Pollard et al. | |
| 7,547,070 B2 * | 6/2009 | Nathan | B60N 2/206 296/65.17 |
| 8,596,716 B1 * | 12/2013 | Caruso | B60N 2/90 297/217.3 |

(Continued)

FOREIGN PATENT DOCUMENTS

| | | |
|---|---|---|
| CN | 105711478 A | 6/2016 |
| DE | 102014213301 A1 | 1/2016 |

*Primary Examiner* — Mussa A Shaawat
(74) *Attorney, Agent, or Firm* — Christopher G. Darrow; Darrow Mustafa PC (57) ABSTRACT

Various examples for controlling sway of a furniture that is suspended in a vehicle are disclosed herein. In addition to the suspended furniture, the vehicle can include sway control devices operatively connected to the suspended furniture. The sway control devices can be connected to the suspended furniture via sway lines. The sway control devices can be controlled to adjust the rates that the sway lines are let out or retracted. As a result, the vehicle can control how much the suspended furniture sways.

18 Claims, 6 Drawing Sheets

(56) References Cited

U.S. PATENT DOCUMENTS

| | | | |
|---|---|---|---|
| 2003/0034683 A1* | 2/2003 | Gray | B60N 2/22 |
| | | | 297/378.1 |
| 2007/0269771 A1* | 11/2007 | Lefton | G09B 9/14 |
| | | | 434/29 |
| 2010/0222960 A1 | 9/2010 | Oida et al. | |
| 2013/0097782 A1 | 4/2013 | Carrier | |
| 2015/0307141 A1* | 10/2015 | Ephraim | B62D 33/073 |
| | | | 180/89.13 |

\* cited by examiner

SWAY CONTROL FOR SUSPENDED FURNITURE IN A VEHICLE

TECHNICAL FIELD

The present disclosure generally relates to furniture and, more particularly, to furniture in a vehicle.

BACKGROUND

Many vehicles, such as recreational vehicles, have furniture that includes a human support surface (e.g., beds, couches, seats, etc.) which a passenger can sit and/or lay on to occupy the furniture. This furniture is typically affixed to one or more surfaces (e.g., the floor and/or one or more walls) of the vehicle. However, where a person is occupying the furniture, and the vehicle experiences accelerations as a result of one or more maneuvers of the vehicle, the person may shift position because of changes in their inertia, and may be disturbed as a result. In cases where a person is laying on the human support surface, the person may, for instance, be awoken.

Additionally, hammocks, and other types of suspended furniture, are known. Suspended furniture may sway with forces applied thereto, and thereby lessen the likelihood, as compared to unsuspended furniture, of disturbing occupants of the furniture. However, suspended furniture is not incorporated or otherwise used in vehicles.

SUMMARY

A vehicle can include suspended furniture having an upwardly-facing human support surface. The suspended furniture can increase support for a person sitting and/or laying on the human support surface, as well as mitigate the person shifting positions due to the furniture being suspended, and the suspended furniture swaying with accelerations of the vehicle. The vehicle can also include one or more sway control devices that can be used to control the sway of the suspended furniture.

In one example, a system for controlling sway of suspended furniture in a vehicle is disclosed. The system can include furniture suspended in a vehicle, the suspended furniture having a human support surface. The system can also include a plurality of sway control devices, each of the plurality of sway control devices operatively connected to the suspended furniture via a respective at least one sway line that is let out or retracted by the sway control device. The system can also include a processor operatively connected to each of the plurality of sway control devices. The system can also include memory operatively connected to the processor. The memory can also store a sway control module including instructions that, when executed by the processor, cause the processor to generate one or more control signals for at least one of the plurality of sway control devices to control a rate that the respective at least one sway line is let out or retracted, and thereby control sway of the suspended furniture with respect to a normal position.

In another example, a system for reducing a rate that suspended furniture sways in a vehicle is disclosed. The system can suspend furniture within an interior portion of a vehicle, the suspended furniture having an upwardly-facing human support surface, with at least a portion of the human support surface extending substantially horizontally when the suspended furniture is in a normal position. The system can also include a plurality of sway lines operatively connected to the suspended furniture. The system can also include a plurality of sway control devices for controlling a rate that a respective at least one sway line is let out, each of the plurality of sway lines being controllable by a respective sway control device. The system can also include a processor operatively connected to each of the plurality of sway control devices. The system can also include memory operatively connected to the processor. The memory can store a sway identification module including instructions that, when executed by the processor, cause the processor to identify a direction that the suspended furniture sways away from the normal position. The sway identification module can also include instructions that, when executed by the processor, cause the processor to identify at least one of the plurality of sway control devices whose respective at least one sway line is associated with controlling sway of the suspended furniture along the identified direction. The memory can also store a sway control module including instructions that, when executed by the processor, cause the processor to generate one or more control signals for the identified at least one of the plurality of sway control devices to reduce the rate that the respective at least one sway line is let out as the suspended furniture sways back towards the normal position, and thereby reduce the rate that the suspended furniture sways back towards the normal position.

In another example, a method of controlling sway of suspended furniture in a vehicle is disclosed. The method can include identifying sway with respect to a normal position of furniture suspended in a vehicle. The method can also include controlling a rate that a respective at least one sway line of a plurality of sway lines is let out from a sway control device to thereby control sway of the suspended furniture.

DETAILED DESCRIPTION

This disclosure teaches systems and methods for controlling sway of furniture that is suspended in a vehicle. The vehicle can include sway control devices operatively connected to the suspended furniture. The sway control devices can be connected to the suspended furniture via sway lines. The sway control devices can be controlled to adjust the rates that the sway lines are let out or retracted. As a result, the vehicle can control how much the suspended furniture sways.

Figure 1:
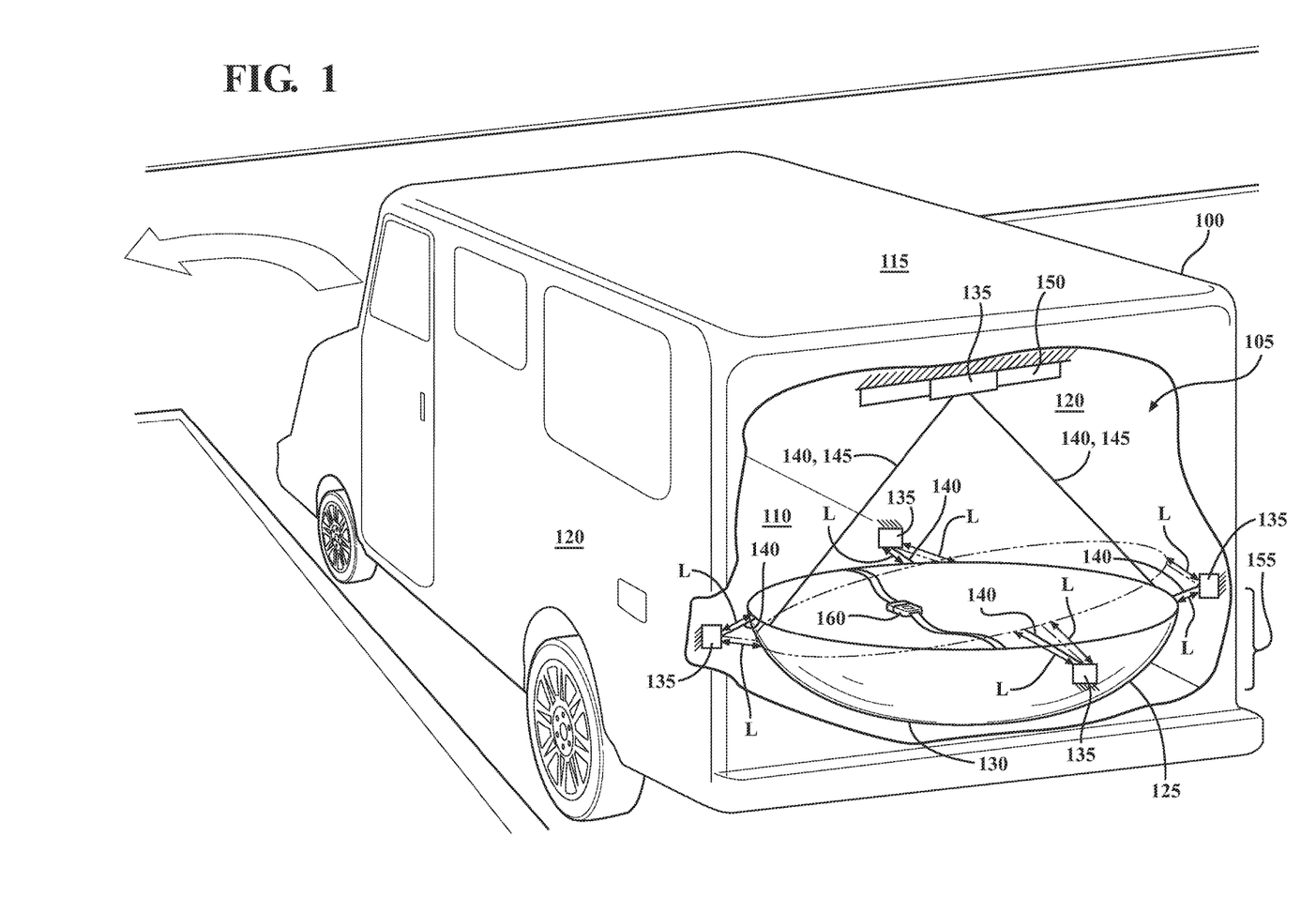
FIG. 1 shows an example of a vehicle having suspended furniture and sway control devices usable to control sway of the suspended furniture.

Referring to FIG. 1, a representative vehicle 100 is shown. In this description, uses of "front," "forward" and the like, and uses of "rear," "rearward" and the like, refer to the longitudinal direction of the vehicle 100. "Front," "forward" and the like refer to the front (fore) of the vehicle 100, while "rear," "rearward" and the like refer to the back (aft) of the vehicle 100. Similarly, uses of "left," right," "sides" and the like refer to the transverse direction of the vehicle 100. "Left," or similar terms, refers to the left side (port) of the vehicle 100, while "right," or other similar terms, refers to the right side (starboard) of the vehicle 100.

In one or more arrangements, the vehicle 100 is a recreational vehicle. However, in other arrangements, the vehicle 100 can also be a sport utility vehicle (SUV), semi-truck, or other form of automobile. While arrangements will be described herein with respect to automobiles, it will be understood that examples disclosed herein are not limited to automobiles. To the contrary, the examples disclosed herein can include any other type of vehicle that can benefit from the disclosed systems and methods (e.g., trains, watercraft, etc.).

The vehicle 100 includes an interior portion 105 (or passenger compartment). The interior portion 105 can have various vehicle surfaces (e.g., a floor 110, a ceiling 115, walls 120 etc.) which can define the interior portion 105. In some arrangements, the vehicle 100 can include other walls, such as interior walls, separating regions (or rooms) within the vehicle 100.

The vehicle 100 can include furniture 125. The furniture 125 can include a human support surface 130. "Human support surface," as used herein, includes any surface on furniture that a person can sit and/or lay on. Generally, the human support surface 130 will be an upwardly facing portion of the furniture 125. In some examples, the furniture 125 is a hammock. In other examples, the furniture 125 can be a bed. In each of these arrangements, the furniture 125 includes at least one human support surface 130. In some arrangements, the furniture 125 can include two or more human support surfaces 130. For example, the furniture 125 can be a bunk bed. However, the furniture 125 is not limited to a hammock or a bed (or bunk bed), and can include other examples of furniture, such as a chair, sofa, etc.

The furniture 125 can be suspended. "Suspended," or "suspend," as used herein, means to hold, bear, and/or maintain in an elevated state with respect to a ground surface. Therefore, the furniture 125 can be held in an elevated state with respect to the floor 110 of the vehicle 100. In one or more arrangements, the furniture 125 can include a rigid frame. The rigid frame can extend along a perimeter (or a portion of the perimeter) of the furniture 125. In some arrangements, the furniture 125 can be suspended via one or more suspension lines 145 attached to the rigid frame.

The furniture 125 may be suspended from the ceiling 115 of the vehicle 100, represented by the arrangement shown in FIG. 1. In other arrangements, the furniture 125 can be suspended from one or more walls 120, the ceiling 115 at one or multiple points, and/or various combinations thereof. The furniture 125 can be suspended by various sides and/or corners along the perimeter of the furniture 125. Additionally or alternatively, the furniture 125 can be suspended by other areas or portions of the furniture 125. In some examples, the suspension lines 145 can be arranged in pairs, with each suspension line 145 having an opposing suspension line 145. In any arrangement, the suspension lines 145 should be connected to the furniture 125 to balance the furniture 125 in addition to maintaining the furniture 125 in an elevated state.

When the furniture 125 is not moving (or not substantially moving) relative to the vehicle 100 (e.g., at rest), the furniture 125 may be in a normal position. The normal position may be a position where the furniture 125 is balanced inside the vehicle 100. In this regard, the normal position may be a position where the suspended furniture 125 is at equilibrium. Additionally, when the furniture 125 is in the normal position, a portion of the human support surface 130 may generally extend horizontally (or substantially horizontally). As stated above, the human support surface 130 is an upwardly-facing surface of the furniture 125. Therefore, in the normal position, a portion of the upwardly-facing human support surface 130 may extend horizontally.

Due to the nature of being suspended, absent resistive forces that counteract the inertial forces of the furniture 125, the furniture 125 can sway with accelerations of the vehicle 100. For example, where the vehicle 100 decelerates (e.g., negative acceleration), the furniture 125 sways forward due to the inertial forces of the furniture 125. As another example, where the vehicle 100 turns, the furniture 125 sways away from the direction of turn (e.g., the human support surface 130 will bank with the turn). After the furniture 125 sways away from a normal position, the furniture 125 sways back towards (and past) the normal position until, eventually, the furniture 125 comes to rest in the normal position. This swaying back and forth from the normal position may cause discomfort to a person occupying the furniture 125.

In one or more arrangements, the vehicle 100 can include one or more sway control devices 135. The sway control device(s) 135 can be operatively connected to the furniture 125. The sway control device(s) 135 can be connected to the furniture 125 by one or more respective sway lines 140. Each sway control device 135 can have at least one respective sway line 140 associated therewith. The sway control device(s) 135 can be any devices and/or components operable to control a rate that respective sway line(s) 140 are let out or retracted. In some arrangements, the respective sway line(s) 140 can each be let out and retracted at a default rate by the sway control device(s) 135. The default rate may be a rate that maintains each of the respective sway line(s) 140 in a taut position, but without exerting force (or substantial force) on the suspended furniture 125. In this regard, the respective sway line(s) 140 can each be let out or retracted freely (e.g., according to the inertial forces of the furniture 125 and any other natural forces on the furniture 125).

In some arrangements, the sway control device(s) 135 can be controlled to retract and let out respective sway line(s) 140 at the default rate. In this arrangement, the sway control device(s) 135 can control the rate that the respective sway line(s) 140 are let out and retracted, with the rate being the default rate. In some instances, the sway control device(s) 135 can also be controlled to retract and let out respective sway line(s) 140 at a rate different from the default rate.

In other arrangements, the sway control device(s) 135 can be in a disabled state (e.g., not being controlled) and, in the disabled state, the respective sway line(s) 140 can be let out and retracted at the default rate. In this arrangement, the sway control device(s) 135 can be disabled to let out and retract respective sway line(s) 140 at the default rate, and be enabled and controlled to let out and retract respective sway line(s) 140 at a rate different from the default rate.

In these and other arrangements, the sway control device(s) 135 can let out and retract respective sway line(s) 140 at the default rate in some instances and, in other instances, can let out and retract respective sway line(s) 140 at a rate different from the default rate.

In one or more arrangements, the vehicle 100 can include one or more height control systems 150. The height control system(s) 150 can be operatively connected to the vehicle 100 and the furniture 125. The height control system(s) 150 can be any components or group of components operable to change a height 155 that the furniture 125 is suspended from the floor 110 of the vehicle 100.

In one or more arrangements, the furniture 125 may include a locking mechanism 160. The locking mechanism 160 may be any device(s) and/or component(s) configured to secure an occupant to the furniture 125, and thereby prevent (or inhibit) the occupant from falling out of the furniture 125. For example, the locking mechanism 160 may be similar to a seatbelt. In some examples, the locking mechanism 160 may be a belt and buckle system. In other examples, the locking mechanism may be a harness system. Although shown as a single locking mechanism, in some arrangements, the furniture 125 may include a plurality of locking mechanisms 160.

Figure 2:
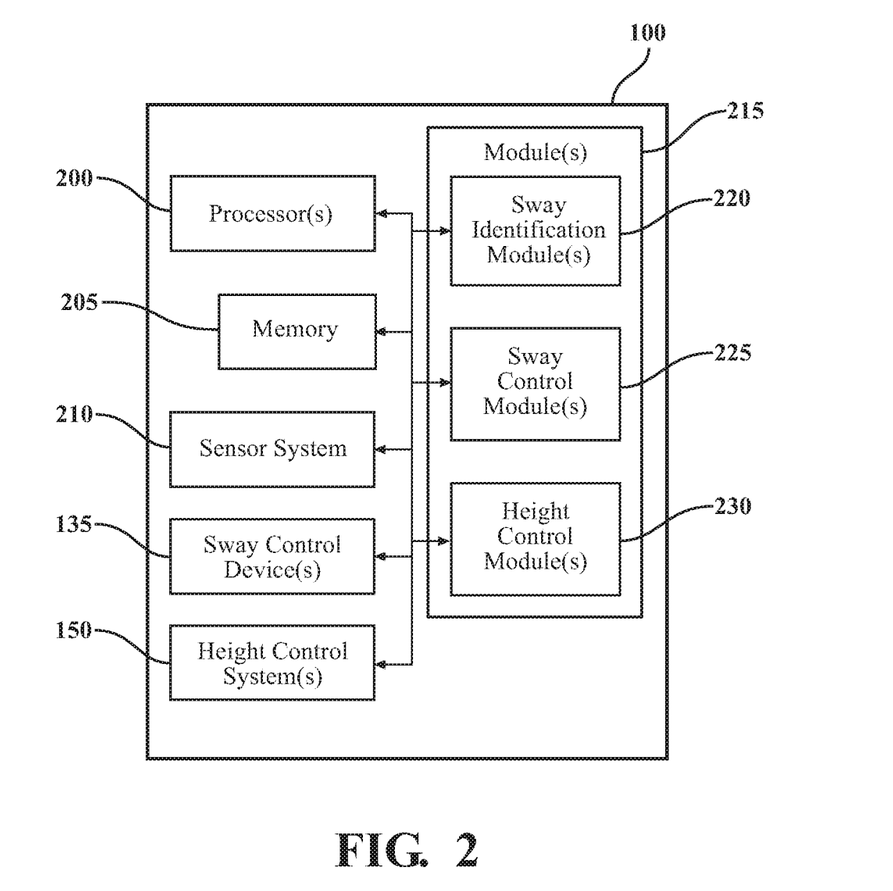
FIG. 2 shows a schematic diagram of the vehicle of FIG. 1.

Referring now to FIG. 1 and FIG. 2, the vehicle 100 can include one or more processor(s) 200. The processor(s) 200 are configured to implement or perform various functions described herein. In one or more arrangements, the processor(s) 200 can be a main processor of the vehicle 100. For instance, the processor(s) 200 can be an electronic control unit (ECU). The vehicle 100 can also include memory 205 for storing one or more types of data. The memory 205 can be a component of the processor(s) 200, or the memory 205 can be operatively connected to the processor(s) 200 for use thereby. The term "operatively connected," as used throughout this description, can include direct or indirect connections, including connections without direct physical contact.

The vehicle 100 can include a sensor system 210. The sensor system 210 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

The sensor system 210 can include one or more sensors configured to monitor or detect a position, location, and/or orientation of the furniture 125. In some arrangements, the sensor system 210 can include one or more cameras positioned to capture image(s) of the furniture 125. The camera(s) can detect changes in position of the furniture 125 with respect to the interior portion 105 of the vehicle 100. Additionally or alternatively, the sensor system 210 can include one or more displacement sensors. The displacement sensor(s) can detect relative movement of the furniture 125 within in the vehicle 100. For example, the displacement sensor(s) can detect extension and/or retraction of respective sway line(s) 140. As the respective sway line(s) 140 extend and retract, the displacement sensor(s) can detect how much the respective sway line(s) 140 extend and retract. Additionally or alternatively, the sensor system 210 can include a gyroscope, inertial measurement unit (IMU), accelerometer, etc. (or various combinations thereof) positioned on the furniture 125. These sensors (and/or combinations of these sensors) can be used to track relative positions and changes in positions of the furniture 125 within the vehicle 100.

In one or more arrangements, the memory 205 can include various instructions stored thereon. In one or more arrangements, the memory 205 can store one or more modules 215. Modules 215 can be or include computer-readable instructions that, when executed by the processor(s) 200, cause the processor(s) 200 to perform the various functions disclosed herein. While one or more modules 215 can be stored on memory 205, it should be noted the various modules 215 can be stored on and/or be a component of the processor(s) 200, can be remotely stored and accessible by the processor(s) 200, etc.

The vehicle 100 can include one or more sway identification modules 220. The sway identification module(s) 220 can include instructions for identifying a direction that the furniture 125 sways with respect to (e.g., away from or back towards) the normal position. The furniture 125 may sway due to inertial forces on the furniture 125, which are caused by a number of reasons (e.g., the vehicle speeding up, slowing down, turning, etc.).

In some arrangements, the sway identification module(s) 220 can monitor amounts that the respective sway line(s) 140 are let out or retracted with respect to sway control device(s) 135. In these arrangements, displacement sensor(s) can be positioned on and/or operatively connected to each respective sway line(s) 140. The displacement sensor(s) can detect when (and an amount) the respective sway line(s) 140 are let out or retracted with respect to the sway control device(s) 135. The sway identification module(s) 220 can identify the direction that the furniture 125 sways based on which respective sway line(s) 140 are let out or retracted.

In the example shown in FIG. 1, the furniture 125 sways away from the normal position towards the right side of the vehicle 100. Such an example would occur when, for example, the vehicle 100 executes a left turn, as shown. The displacement sensor(s) can identify the length L for each of the respective sway line(s) 140. More specifically, the displacement sensor(s) can identify when the length(s) L change as the furniture 125 sways towards the right side of the vehicle 100. As shown, when the furniture 125 sways right, each of the lengths L increase for the sway lines 140 attached to the middle (e.g., to the front and to the back) of the furniture 125 and to the left side of the furniture 125. However, length L decreases for the sway line 140 attached to the right side of the furniture 125. In this regard, the lengths L increase for each sway line 140, except for the sway line 140 associated with the direction that the furniture 125 sways (i.e., right). Based on this relationship, in the example in FIG. 1, the sway identification module(s) 220 can determine that the furniture 125 swayed right.

In other arrangements, the sway identification module(s) 220 can monitor a position (using cameras, IMUs, accelerometers, gyroscopes, etc.) of the furniture 125 with respect to the interior portion 105 of the vehicle 100. The sway identification module(s) 220 can detect changes in the position of the furniture 125 with respect to the interior portion 105 of the vehicle. In this regard, the sway identification module(s) 220 can identify a direction that the furniture 125 sways based on the changes in position of the furniture 125 with respect to the interior portion of the vehicle 100.

In one or more arrangements, the sway identification module(s) 220 can identify one or more sway control device(s) 135 corresponding to the identified direction that the furniture 125 sways. The sway identification module(s) 220 can determine which sway control device(s) 135 control respective sway line(s) 140 extending along the direction that the furniture 125 sways. In other arrangements, the sway identification module(s) 220 can identify sway control device(s) 135 based on which respective sway line(s) 140 retract (or are let out). In still other arrangements, the sway identification module(s) 220 can include or otherwise access a database including a plurality of possible directions that the furniture 125 can sway. The database can also include one or more sway control device(s) 135 associated with each of the possible directions that the furniture 125 can sway. The sway identification module(s) 220 can access the database, and, with the identified direction that the furniture 125 sways, look up the sway control device(s) 135 associated with the identified direction. In each of these arrangements, the sway identification module(s) 220 can identify one or more sway control device(s) 135 that correspond to respective sway line(s) 140 that can slow down the furniture 125 when the furniture 125 sways back towards (and past) the normal position.

In one or more arrangements, the sway identification module(s) 220 can identify when the furniture 125 changes sway direction. Similar to identifying the direction that the furniture 125 sways from the normal position, the sway identification module(s) 220 can determine when the sway direction changes. The sway identification module(s) 220 can identify when the furniture 125 sways towards the normal position. "Towards," as used herein, includes any motion of the furniture 125 that brings the furniture 125 closer to a location and/or position. Therefore, when the furniture 125 sways towards the normal position, the furniture moves closer to the normal position. Also, when the furniture 125 sways towards the left, right, front, rear, etc. of the vehicle 100, the furniture 125 moves closer to the left, right, front, rear, etc. of the vehicle 100.

In some arrangements, the sway identification module(s) 220 can identify when the furniture 125 sways in an opposite direction. For example, the sway identification module(s) 220 can detect changes in the position of the furniture 125 with respect to the interior portion 105 of the vehicle 100. In this regard, the sway identification module(s) 220 can identify a direction that the furniture 125 sways based on the changes in position of the furniture 125 with respect to the interior portion 105 of the vehicle 100. In this example, the sway identification module(s) 220 can identify the direction the furniture 125 sways away from the normal position, and can also identify when the furniture 125 begins to sway back towards the normal position based on changes in the position of the furniture 125. In other arrangements, the sway identification module(s) 220 can identify when respective sway line(s) 140 for a sway control device 135 retracts and, subsequently, lets out. In both arrangements, the sway identification module(s) 220 can identify when the furniture 125 sways back towards the normal position.

The vehicle 100 can include one or more sway control modules 225. The sway control module(s) 225 can include instructions to generate one or more control signals for the sway control device(s) 135. The sway control module(s) 225 can control a rate that the respective sway line(s) 140 are let out or retracted by transmitting the generated control signals to the sway control device(s) 135. In this regard, the sway control module(s) 225 can control how much the furniture 125 sways by controlling the rate that the respective sway line(s) 140 are let out or retract.

The sway control module(s) 225 can generate the control signals for those sway control device(s) 135 identified via the sway identification module(s) 220. The sway control module(s) 225 can generate control signals to change the rate that the respective sway line(s) 140 are let out or retracted from the default rate, as previously described.

In one or more arrangements, the sway control module(s) 225 can control the rate that respective sway line(s) 140 are let out as the furniture 125 sways away from and/or towards the normal position. In the example depicted in FIG. 1, the sway control module(s) 225 can generate one or more control signals for, at least, sway control device(s) 135 associated with respective sway line(s) 140 attached to the right side of the furniture 125. The sway control module(s) 225 can control a rate that the respective sway line(s) 140 are let out as the furniture 125 sways back towards the normal position (e.g., sways back to the left towards the normal position). For this purpose, the sway control module(s) 225 can generate control signals for the sway control device(s) 135 associated with the respective sway line(s) 140 attached to the right side of the furniture 125 to reduce a rate that the respective sway line(s) 140 are let out.

The sway control module(s) 225 can reduce the rate that respective sway line(s) 140 are let out at the top of the sway (e.g., start of the descent towards the normal position), somewhere between the top of the sway and the furniture 125 being at the normal position, and/or at some point when the furniture 125 sways past the normal position. In some arrangements, the sway control module(s) 225 can gradually reduce the rate that respective sway line(s) 140 are let out. In this example, at different points throughout the sway of the furniture 125 back towards (and past) the normal position, the respective sway line(s) 140 can be let out at different rates. For example, as the furniture 125 approaches and passes the normal position, the respective sway line(s) 140 can be let out at a rate that is reduced from when the furniture 125 starts its descent towards the normal position. In this regard, the respective sway line(s) 140 that are oriented to pull the furniture 125 as the furniture 125 sways toward the normal position (and past the normal position) are controlled to let out at a reduced rate.

It is noted that, when the furniture 125 initially sways away from the normal position, the sway of the furniture 125 may, in some instances, not be controlled via the sway lines 140 (e.g., the sway lines 140 let out and retract at the default rate), and thereby the furniture 125 can sway freely. In some arrangements, though, one or more respective sway line(s) 140 may be controlled to reduce a rate that the respective sway line(s) 140 are let out as the furniture 125 sways away from the normal position on the initial sway from the normal position. However, in both arrangements, after the first pass of the normal position while the furniture 125 sways, one or more respective sway line(s) 140 are controlled to pull the furniture 125 (by reducing the rate that the sway line(s) 140 are let out). As a result, the furniture 125 sways less.

In one or more arrangements, the sway identification module(s) 220 can compare the amount (e.g., magnitude) that the furniture 125 sways to a threshold. The threshold may be an amount that would cause the furniture 125 to sway back and forth from the normal position several times (e.g., two, three, four, etc.) and cause discomfort to an occupant positioned on the human support surface 130. In some arrangements, the threshold may be set by an occupant positioned on the human support surface 130 of the furniture 125 according to their personal preferences. For example, some occupants may enjoy rocking motion and therefore want to sway more, and other occupants may have discomfort associated with swaying and therefore may want to sway less. In this regard, the occupant can set the threshold according to their preferences, with increased threshold permitting more swaying of the furniture 125, and reduced threshold constraining swaying of the furniture 125. In other arrangements, the threshold may be fixed.

The sway identification module(s) 220 can determine the amount that the furniture 125 sways by identifying, for example, the change in position (using the camera(s), IMU(s), accelerometer(s), gyroscope(s), etc.), the amount that respective sway line(s) 140 are let out or retract (via the displacement sensor(s)), etc. The sway identification module(s) 220 can determine whether the amount that the furniture 125 sways meets (e.g., is greater than or equal to) the threshold. If the threshold is not met, the sway control module(s) 225 may not generate the one or more control signals to control the rate that the respective sway line(s) 140 are let out.

Figure 3:
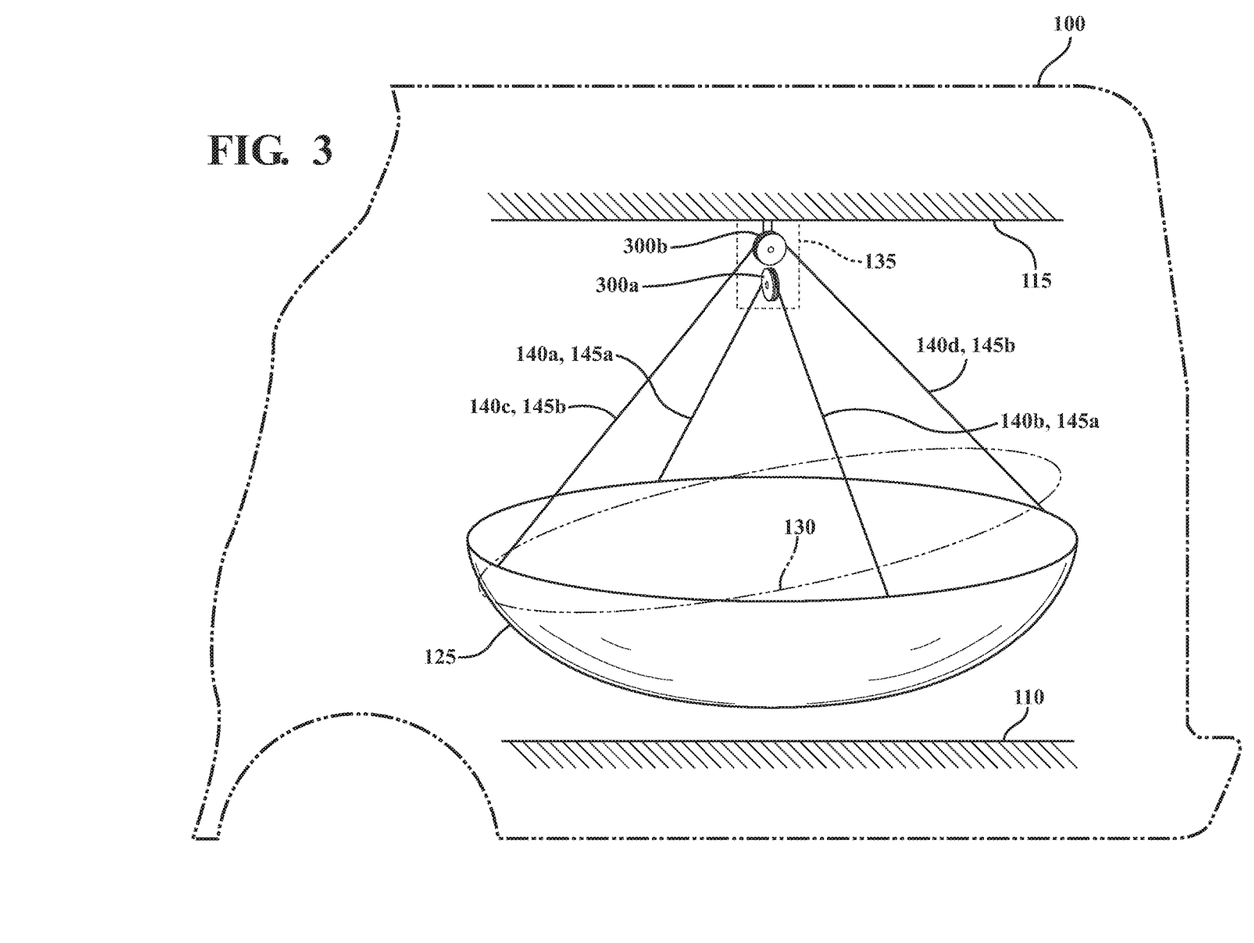
FIG. 3 shows an example arrangement of sway control devices usable to control sway of the suspended furniture of FIG. 1.

Referring now to FIG. 3, an example arrangement of sway control device(s) 135, respective sway line(s) 135 and suspension line(s) 145 in the vehicle 100 is shown. In this example, one or more of the sway control device(s) 135 includes a pulley 300 and a suspension line 145 (the combination thereof referred to herein as a pulley system). The pulley 300 may be actuatable (e.g., an actuatable pulley). The pulley 300 may include an actuator for changing the rotation rate and/or direction for the pulley 300. The actuator can be selectively engaged and disengaged, and therefore, the rotation rate and direction for the pulley 300 can be selectively controlled. In some examples, the pulley 300 can be powered by a motor, such as a servo-motor. The motor may be clutched. In this regard, when the clutch is engaged, the motor can control rotation of the pulley 300, and when the clutch is disengaged, the pulley 300 rotates freely without any influence from the motor. The actuator of the pulley 300 can receive control signals, as will be discussed below, to change a rotation rate of the pulley 300. The pulley 300 can rotate about an axis. The pulley 300 can be controlled to rotate clockwise about the axis, and can be controlled to rotate counterclockwise about the axis. In this example, the pulley 300 can be connected, via the suspension line 145, to the furniture 125 at opposing sides (or ends, or corners) of the furniture 125.

As shown in FIG. 3, the vehicle 100 can include two pulleys 300*a*, 300*b*. Each of the pulleys 300*a*, 300*b* can be connected to the furniture 125 via suspension lines 145*a*, 145*b*, respectively. In this example, one suspension line 145*a* can include both a first sway line 140*a* and a second sway line 140*b*, and the other suspension line 145*b* can include a third sway line 140*c* and a fourth sway line 140*d*. As shown, the first sway line 140*a* can extend from the first pulley 300*a* to a region of the furniture 125 towards the front of the vehicle 100, and the second sway line 140*b* can extend from the first pulley 300*a* to an opposite region of the furniture 125 (e.g., towards the rear of the vehicle 100). Similarly, the third sway line 140*c* can extend from the second pulley 300*b* to a region of the furniture 125 towards the left side of the vehicle 100, and the fourth sway line 140*d* can extend from the second pulley 300*b* to a region of the furniture 125 towards the right side of the vehicle 100.

Referring now to FIG. 2 and FIG. 3, the sway identification module(s) 220 can include instructions for identifying a direction that the furniture 125 sways away from the normal position. In some arrangements, the sway identification module(s) 220 can monitor an amount that the respective sway line(s) 140*a*-140*d* let out or retract. The sway identification module(s) 220 can identify the direction that the furniture 125 sways based on which respective sway line(s) 140*a*-140*d* retract. In the example shown in FIG. 3, the sway identification module(s) 220 can monitor the amount that the sway lines 140*a*-140*d* retract or are let out based on rotation of the pulleys 300*a*, 300*b*. In some arrangements, the pulleys 300*a*, 300*b* may include one or more rotation sensors, such as a tachometer, Hall effect sensor, etc. The rotation sensor(s) may detect a direction (e.g., clockwise or counterclockwise) that the pulleys 300*a*, 300*b* rotate about the axis. Based on which pulley 300*a*, 300*b* rotates, and the arrangement of the vehicle 100, the sway identification module(s) 220 can identify the direction that the furniture 125 sways.

Similarly, the sway identification module(s) 220 can identify when the furniture 125 changes sway direction. Similar to identifying the direction that the furniture 125 sways from the normal position, the sway identification module(s) 220 can determine when the sway direction changes based on changes in the direction of rotation for the pulleys 300*a*, 300*b*.

The sway control module(s) 225 can include instructions to generate one or more control signals for the one or more actuators attached to the pulleys 300*a*, 300*b*. The sway control module(s) 225 can control a rate that the respective sway line(s) 140*a*-140*d* are let out or retracted by transmitting the generated control signals to the actuators for the pulleys 300*a*, 300*b*. In this regard, the sway control module(s) 225 can control how the furniture 125 sways by controlling the rate that the respective sway line(s) 140*a*-140*d* are let out or retracted.

As the furniture 125 sways, the suspension line 145*a*, 145*b* will rotate about a respective pulley 300*a*, 300*b* according to the natural sway of the furniture 125 due to the inertial force(s) on the furniture 125. In some instances, the pulleys 300*a*, 300*b* may not be controlled (e.g., actuator is disengaged), and thereby the suspension lines 145*a*, 145*b* can rotate freely about the pulleys 300*a*, 300*b*. Where the pulleys 300*a*, 300*b* are not controlled, the rate that the suspension lines 145*a*, 145*b* rotate about the pulleys 300*a*, 300*b* (e.g., the rate that respective sway line(s) 140*a*-140*d* are let out or retract) may be the default rate.

The sway control module(s) 225 can generate the control signals for pulleys 300*a*, 300*b* associated with any sway lines 140 identified via the sway identification module(s) 220. The sway control module(s) 225 can generate control signals to engage the actuator, and change the rotation rate of the pulleys 300*a*, 300*b*. In this regard, the sway control module(s) 225 can generate control signals to change the rate that the respective sway line(s) 140*a*-140*d* are let out or retracted from the default rate, as previously described.

Figure 4:
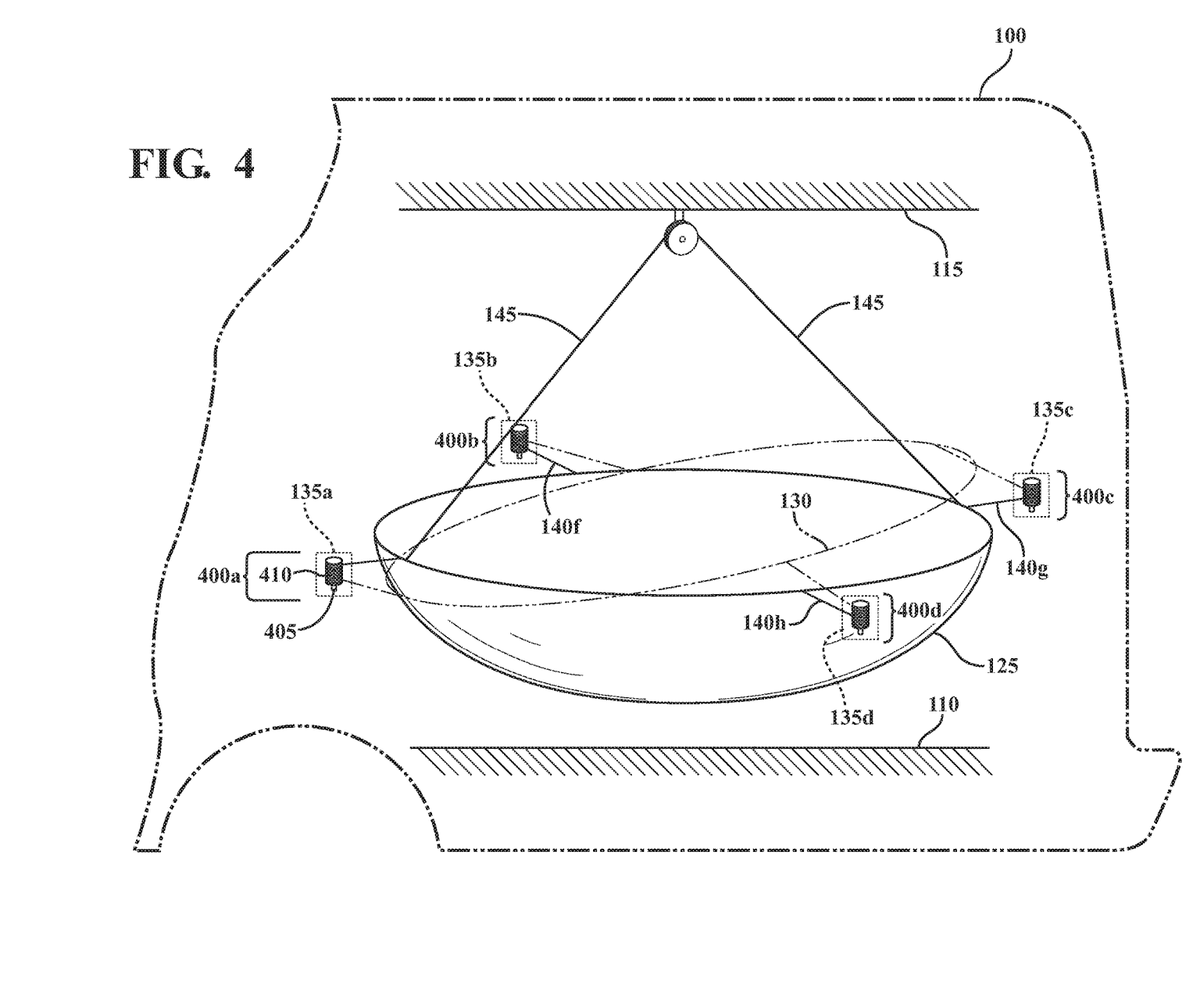
FIG. 4 shows another example arrangement of sway control devices usable to control sway of the suspended furniture of FIG. 1.

The sway control module(s) 225 can control the actuator(s) for the pulleys 300*a*, 300*b* to reduce a rotation rate of the pulleys 300*a*, 300*b*, and thereby reduce the rate that any of the identified respective sway line(s) 140*a*-140*d* are let out at the top of the sway (e.g., start of the descent towards the normal position), somewhere between the top of the sway and the furniture 125 being at the normal position, and/or at some point when the furniture 125 sway past the normal position Referring now to FIG. 4, another example arrangement of sway control device(s) 135, sway line(s) 140, and suspension line(s) 145 in the vehicle 100 is shown. In this example, one or more of the sway control device(s) 135 can include a damping system 400. The damping system 400 may include a damper 405 and a reel 410. The damper 405 can be a rotary damper, a linear damper, etc. In some arrangements, the damper 405 may be adjustable (e.g., an adjustable rotary damper, an adjustable linear damper, etc.). In this regard, the damper 405 can receive damper control signals for changing a damping coefficient of the damper 405. In some examples, the damper 405 can be operatively connected to a reel 410. In this regard, each reel 410 can include a respective damper 405. The damper 405 can control rotation of the reel 410. Additionally, at one end, the sway line 140 can be connected to the furniture 125, and wrapped around the reel 410 at the other end. In some arrangements, the damper 405 can control rotation of the reel 410 in one and/or both directions. In this regard, the damper 405 can control the rate that the sway line 140 is let out from or retracted into the reel 410. The furniture 125 can be suspended via the suspension line(s) 145. In this regard, the vehicle 100 can include both sway line(s) 140 and suspension line(s) 145.

The sway identification module(s) 220 can include instructions for identifying a direction that the furniture 125 sways away from the normal position. In some arrangements, the sway identification module(s) 220 can monitor an amount that a sway line 140 lets out or retracts. The sway identification module(s) 220 can identify the direction that the furniture 125 sways based on which respective sway line(s) 140 retract. In the example shown in FIG. 4, the sway identification module(s) 220 can monitor the amount that the sway lines 140e-140h retract or let out based on the rotation of the reels 410. In some arrangements, each reel 410 may include one or more rotation sensors, such as a tachometer, Hall effect sensor, etc. The rotation sensor(s) may detect a direction (e.g., clockwise or counterclockwise) that reels 410 rotate. Based on which reel 410 rotates, the sway identification module(s) 220 can identify the direction that the furniture 125 sways.

Similarly, the sway identification module(s) 220 can identify when the furniture 125 changes sway direction. Similar to identifying the direction that the furniture 125 sways from the normal position, the sway identification module(s) 220 can determine when the sway direction changes based on changes in the direction of rotation for a respective reel 410.

The sway control module(s) 225 can include instructions to generate one or damper control signals for one or more dampers 405 attached to respective reels 410. The sway control module(s) 225 can control a rate that the respective sway line(s) 140 are let out or retracted by transmitting the generated control signals to the dampers 405 for the reels 410. In this regard, the sway control module(s) 225 can control how the furniture 125 sways by controlling the rate that the respective sway line(s) 140 are let out or retracted from a reel 410.

The sway control module(s) 225 can generate the control signals for dampers 405 associated with any respective sway line(s) 140 identified via the sway identification module(s) 220. The sway control module(s) 225 can generate control signals for the respective damper(s) 405 identified via the sway identification module(s) 220, and change the rotation rate of the reels 410.

The sway control module(s) 225 can control the respective damper(s) 405 for the reels 410 to reduce a rotation rate of the reels 410, and thereby reduce the rate that any of the identified respective sway line(s) 140 are let out from a reel 410 at the top of the sway (e.g., start of the descent towards the normal position), somewhere between the top of the sway and the furniture 125 being at the normal position, and/or at some point when the furniture 125 sway past the normal position While the previous arrangements were described in reference to FIG. 3 and FIG. 4, it is noted that the present disclosure is not limited to either arrangement. Various combinations of these arrangements can be used, and the sway control device(s) 135 can be modified and/or supplemented with other components used or usable to change and/or control a rate that that respective sway line(s) 140 let out or retract.

Figure 5:
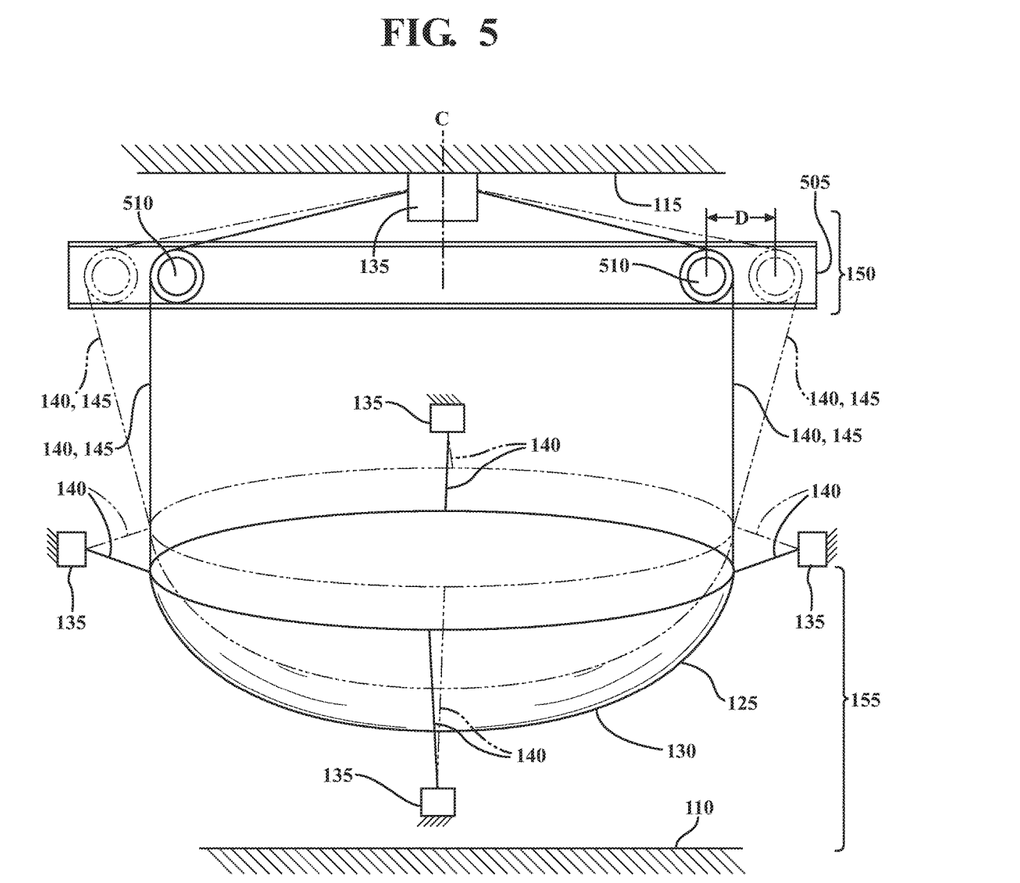
FIG. 5 shows another example arrangement of sway control devices usable to control sway of the suspended furniture, as well as an example arrangement of a height control system for the suspended furniture of FIG. 1.

Referring now to FIG. 5, another example arrangement of sway control device(s) 135 are shown sway line(s) 140, along with a height control system 150 is shown. As stated above, the height control system 150 can be any component or group of components configured to change a height 155 that the furniture 125 is suspended from the floor 110 of the vehicle 100. In the example shown in FIG. 5, the height control system 150 can include a track 505. The track 505 can be attached to, for example, the ceiling 115 of the vehicle 100. The track 505 can include a pair of opposing height control devices 510. In some arrangements, the height control devices 510 can be pulleys. The suspension line(s) 145 can be positioned along each of the height control devices 510. The height control devices 510 can include motors, for example, that control the distance from a center C of the track 505. Each height control device 510 can move in unison with one another, such that they both are the same distance from the center C of the track 505. As the height control devices 510 move farther away from the center C, the furniture 125 can move closer to the ceiling 115. In this regard, the furniture 125 can be suspended at different heights 155 based on the distance between the height control devices 510. As shown, moving the height control devices 510 a distance D from their previous location, the furniture 125 is elevated a corresponding height 155. In doing so, the furniture 125 may sway less as the furniture 125 is elevated. For example, as the respective suspension line(s) 145 are moved outwardly from the center C with the height control devices 510, the suspension line(s) 145 may be pulling the furniture 125 at an angle, rather than in a vertical direction. As a result, a directional force component will be introduced that pulls the furniture 125 in opposing directions. The directional force component can cause the furniture 125 to sway less. While this example is described, the present disclosure is not limited to this example, and can include other examples of adjusting the suspension height of the furniture 125.

Referring to FIG. 2 and FIG. 5, the vehicle 100 can include one or more height control modules 230. The height control module(s) 230 can control a suspension height 155 of the suspended furniture 125. The height control module(s) 230 can include instructions to receive a height input from an occupant of the vehicle 100. In some arrangements, the vehicle 100 can include an input system (not shown), such as a dial, a touch sensitive display, button(s), etc. that are usable to adjust the suspension height 155. The height control module(s) 230 can receive signals corresponding to a height input from the input system. Based on the height input, the height control module(s) 230 can include instructions to generate one or more height control signals for the height control device(s) 510 that cause the height control device(s) 510 to adjust the suspension height 155 of the furniture 125.

Figure 6:
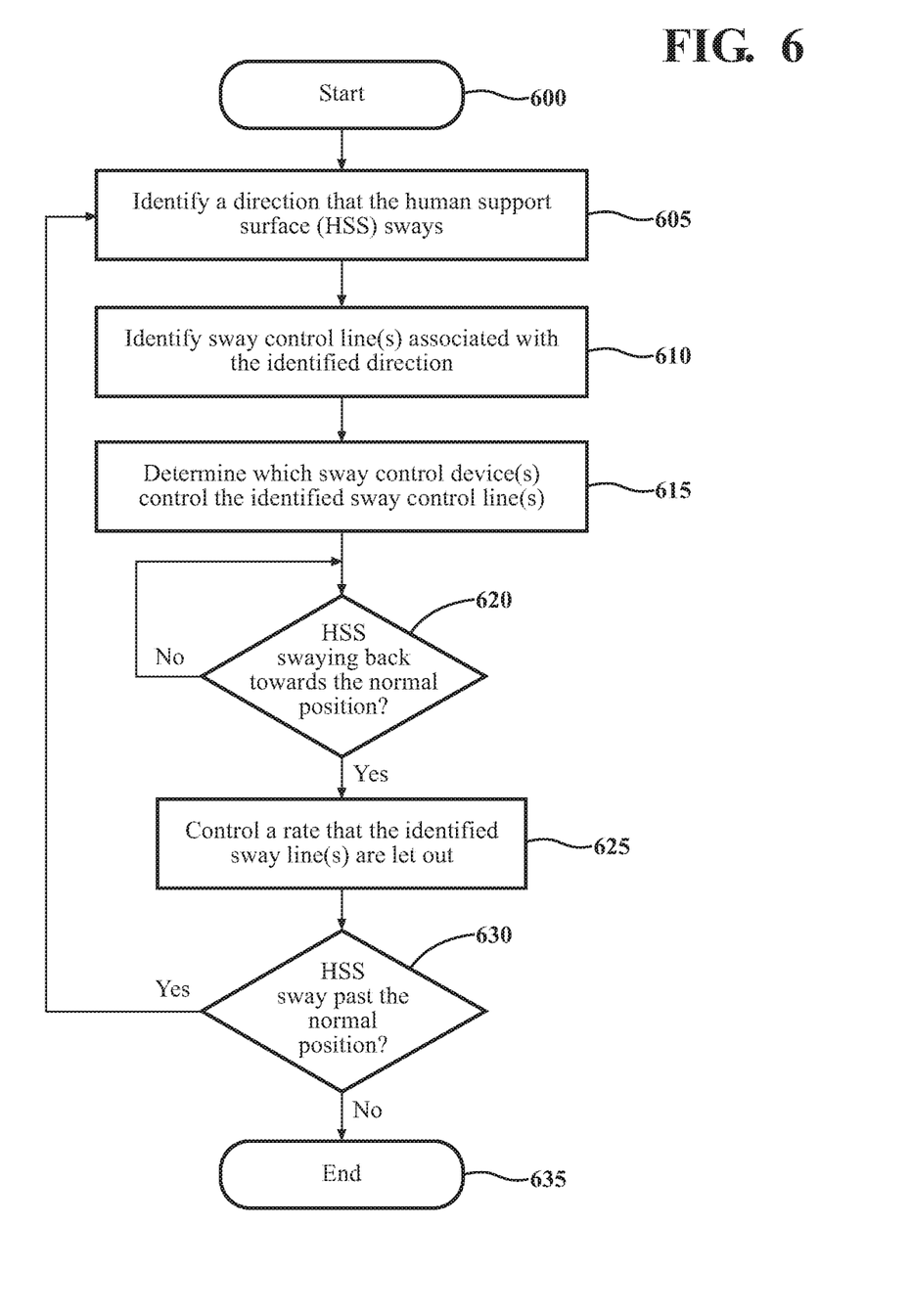
FIG. 6 shows a flowchart depicting an example method of controlling sway of the suspended furniture.

Referring now to FIG. 6, a flowchart depicting an example method of controlling sway of suspended furniture in a vehicle will be described. The flowchart shown in FIG. 6 is only for exemplary purposes. The following disclosure should not be limited to each and every function block shown in FIG. 6. To the contrary, the method does not require each and every function block shown. In some examples, the method may include additional function blocks. Further, the method does not need to be performed in the same chronological order shown in FIG. 6.

At starting block 600, the method can begin. In some arrangements, the method can begin when the vehicle 100 is turned on. In other arrangements, the method can begin when a person is occupying the human support surface 130 of the furniture 125. The method can continue to function block 605.

At function block 605, the sway identification module(s) 220 can include instructions to identify a direction that the furniture 125 sways away from a normal position. The furniture 125 may sway for a number of reasons including, for example, the vehicle 100 turning, speeding up, braking, etc. The sway identification module(s) 220 can identify the direction that the furniture 125 sways using various methods. In one example, the sway identification module(s) 220 can receive data from displacement sensor(s) positioned on or otherwise operatively connected to each of the respective sway line(s) 140. The sway identification module(s) 220 can identify the direction that the furniture 125 sways by determining which of the respective sway line(s) 140 retract and/or which respective sway line(s) 140 let out. In another example, the sway identification module(s) 220 can receive data from various sensors of the sensor system 210 positioned to monitor the position, orientation, etc. of the furniture 125 within the vehicle 100. The sway identification module(s) 220 can determine when the position, orientation, etc. of the furniture 125 changes. The sway identification module(s) 220 can identify the direction that the furniture 125 sways based on the changes in position, orientation, etc. as detected by the sensor(s) of the sensor system 210. The method can continue to function block 610.

At function block 610, the sway identification module(s) 220 can identify respective sway line(s) 140 associated with the identified direction at function block 605. The sway identification module(s) 220 can identify particular sway line(s) 140 according to the method used to identify the direction that the furniture 125 sways. For example, where, at function block 605, the sway identification module(s) 220 identify the direction by detecting changes in the position, orientation, etc. of the furniture 125, at function block 610, the sway identification module(s) 220 can include or otherwise access a database including a plurality of possible directions that the furniture 125 can sway. The database can also include sway line(s) associated with each of the possible directions. The sway identification module(s) 220 can access the database, and, with the identified direction, look up the sway line(s) 140 associated with the identified direction at function block 605. In another example, where, at function block 605, the sway identification module(s) 220 identify the direction using the displacement sensor(s), at function block 610, the sway identification module can identify the respective sway line(s) 140 that retract as the furniture 125 sways from the normal position. In either example, the sway identification module(s) 220 can identify respective sway line(s) 140 that can slow down the furniture 125 when it sways back towards (and past) the normal position. The method can continue to function block 615.

At function block 615, the sway identification module(s) 220 can determine which sway control device(s) 135 control the respective sway line(s) 140 identified at function block 610. Each sway line 140 can be associated with a sway control device 135. In this regard, the sway identification module(s) 220 can determine which sway control device(s) 135 are associated with the identified respective sway line(s) 140, and the sway control device(s) 135 can be associated with respective sway line(s) 140 that they control. The method can continue to decision block 620.

At decision block 620, the sway identification module(s) 220 can determine when the furniture 125 sways back towards the normal position. The sway identification module(s) 220 can determine when the furniture 125 sways back towards the normal position using a number of different methods. The sway identification module(s) 220 can detect changes in sway direction similar to the methods used to identify the direction the furniture 125 sways from the normal position. For example, when using displacement sensor(s), when a sway line 140 that previously was retracting begins to let out, the sway identification module(s) 220 can determine that the furniture 125 is beginning to sway back towards the normal position. In another example, when the position of the furniture 125 changes direction (e.g., sways away from the normal position), the sway identification module(s) 220 can determine when the direction changes again (e.g., in the opposite direction). When the furniture 125 changes direction twice, the sway identification module(s) 220 can determine that the furniture 125 is swaying back towards the normal position. At decision block 620, while the furniture 125 sways away from the normal position, the method can remain in a loop. However, when the furniture sways back towards the normal position, the method can continue to function block 625.

At function block 625, the sway control module(s) 225 can control the rate that the identified respective sway line(s) 140 at function block 610 are let out. The sway control module(s) 225 can generate one or more control signals for the sway control device(s) 135 identified at function block 615. The sway control module(s) 225 can generate control signals that cause the sway control device(s) 135 to let out the respective sway line(s) 140 slower. As described above, in some arrangements, each respective sway line 140 can be let out and retracted at a default rate. The default rate may be a rate that maintains the respective sway line 140 in a taut position, but without exerting force on the furniture 125. In this regard, each respective sway line 140 can be let out or retracted freely (e.g., according to the natural forces on the furniture 125). The sway control module(s) 225 can generate one or more control signals to change the rate from the default rate for the sway control device(s) 135 identified at function block 615.

The sway control module(s) 225 can reduce the rate the respective sway line(s) 140 are let out. In some arrangements, the sway control module(s) 225 can gradually reduce the rate that the respective sway line(s) 140 are let out. For example, the sway control module(s) 225 can generate control signals to let out the respective sway line(s) 140 at a first rate for the top of the sway (e.g., start of the descent towards the normal position), a second rate for somewhere between the top of the sway and the furniture 125 being at the normal position, and a third rate for when the furniture 125 sway past the normal position. In this example, the rate may be reduced at each interval (e.g., the first rate is greater than the second rate, and the second rate is greater than the third rate). In other arrangements, the sway control module(s) 225 can reduce the rate that the respective sway line 140g is let out when the furniture 125 reaches a threshold position between the top of the sway and the normal position. For example, the threshold position may be halfway between the top of the sway and the normal position. In other examples, the threshold position may be when the furniture 125 reaches the normal position. In each example, the sway control module(s) 225 can generate control signal(s) that cause the respective sway line(s) 140 identified at function block 610 to let out slower, and thereby slow the furniture 125 as it sways towards (and beyond the normal position. From function block 625, the method can continue to decision block 630.

At decision block 630, the sway identification module(s) 220 can determine whether the furniture 125 sways past the normal position. The sway identification module(s) 220 can determine whether the furniture 125 can determine whether the furniture 125 sways past the normal position using similar methods to those described with reference to function block 605. For example, the sway identification module(s) 220 can determine when the furniture 125 is in substantially the same position as the normal position. When the furniture 125 is in the normal position, and then continues to move, the sway identification module(s) 220 can determine that the furniture 125 has swayed past the normal position. If the furniture 125 sways past the normal position, the method can continue back to function block 605. However, if the furniture 125 remains in the normal position, the method can continue to ending block 635.

At ending block 635, the method can end. The method can end when the furniture 125 is at rest in the normal position.

In some arrangements, the sway control module(s) 225 can continue to control the sway control device(s) 135 to let out the respective sway line(s) 140 at a reduced rate as the furniture 125 sways past and away from the normal position (e.g., at decision block 630). In this regard, the control lines initially identified at function block 610 can be controlled to let out at a reduced rate from the default rate while the furniture sways in the same direction. In one or more arrangements, the sway control module(s) 225 can further reduce the rate that the respective sway line(s) 140 are let out when the furniture 125 sways past the normal position. When the furniture begins to sway back towards the normal position, the respective sway line(s) 140 that were previously being controlled to let out at a reduced rate can be controlled to retract at the default rate. In this regard, the sway control device(s) 135 may only be controlled to reduce a rate that respective sway line(s) 140 are let out, and may permit the respective sway line(s) 140 to retract at the default rate.

In some arrangements, the sway identification module(s) 220 can compare the amount (e.g., magnitude) that the furniture 125 sways to a threshold. The sway identification module(s) 220 can determine the amount that the furniture 125 by identifying, for example, the change in position (using the camera(s)), the amount that respective sway line(s) 140 are let out or retract, etc. The sway identification module(s) 220 can determine whether the amount that the furniture 125 sways meets (e.g., is greater than or equal to) the threshold. The threshold may be an amount that would cause the furniture 125 to sway back and forth several times (e.g., two, three, four, etc.) and thereby cause discomfort to an occupant positioned therein. If the threshold is not met, the sway control module(s) 225 may not generate the one or more control signals to control the rate that the respective sway line(s) 140 are let out.

Detailed examples are disclosed herein. However, it is to be understood that the present disclosure is only intended for purposes of providing examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-6, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling sway of suspended furniture in a vehicle, comprising:
    furniture suspended in a vehicle, the suspended furniture having a human support surface;
    a plurality of sway control devices, each of the plurality of sway control devices operatively connected to the suspended furniture via a respective at least one sway line that is let out or retracted by the sway control device;
    a processor operatively connected to each of the plurality of sway control devices; and
    memory operatively connected to the processor, the memory storing:
        a sway control module including instructions that, when executed by the processor, cause the processor to generate one or more control signals for at least one of the plurality of sway control devices to control a rate that the respective at least one sway line is let out or retracted, and thereby control sway of the suspended furniture with respect to a normal position.

2. The system of claim 1, wherein the at least one of the plurality of sway control devices comprises:
    an actuatable pulley having a line positioned therealong and connected to opposing first and second sides of the suspended furniture, a first portion of the line extending between the actuatable pulley and the first side of the suspended furniture defining a respective first sway line, and a second portion of the line extending between the actuatable pulley and the second side of the suspended furniture defining a respective second sway line.

3. The system of claim 2, wherein the one or more control signals control the rate that the respective first and second sway lines are let out or retracted by controlling a rotation rate of the actuatable pulley.

4. The system of claim 1, wherein at the least one of the plurality of sway control devices comprise:
    a damping system configured to receive damper control signals generated via the sway control module that change the rate that the respective at least one sway line is let out or retracted from a reel.

5. The system of claim 4, wherein the damping system includes an adjustable rotary damper operatively connected to the reel.

6. The system of claim 1, wherein the memory further stores:
    a sway identification module including instructions that, when executed by the processor, cause the processor to:
        identify a direction that the suspended furniture sways with respect to the normal position; and
        identify the at least one of the plurality of sway control devices as being at least one of the plurality of sway control devices whose respective at least one sway line is associated with controlling sway of the suspended furniture along the identified direction.

7. The system of claim 6, wherein the sway control module generates the one or more control signals for the identified at least one of the plurality of sway control devices.

8. The system of claim 7, wherein the sway control module generates the one or more controls signals in response to the suspended furniture swaying away from the normal position or back towards the normal position.

9. The system of claim 8, wherein the one or more control signals cause the identified at least one of the plurality of sway control devices to reduce the rate that the respective at least one sway line is let out as the suspended furniture sways away from the normal position or back towards the normal position.

10. The system of claim 1, further comprising at least one height control system, wherein the memory further stores:
    a height control module including instructions that, when executed by the processor, cause the processor to generate one or more height control signals for the at least one height control system to adjust a suspension height of the suspended furniture.

11. A system for reducing a rate that suspended furniture sways in a vehicle, comprising:
    furniture suspended within an interior portion of a vehicle, the suspended furniture having an upwardly-facing human support surface, with at least a portion of the human support surface extending substantially horizontally when the suspended furniture is in a normal position;
    a plurality of sway lines operatively connected to the suspended furniture;
    a plurality of sway control devices for controlling a rate that a respective at least one sway line is let out, each of the plurality of sway lines being controllable by a respective sway control device;
    a processor operatively connected to each of the plurality of sway control devices; and
    memory operatively connected to the processor, the memory storing:
        a sway identification module including instructions that, when executed by the processor, cause the processor to:
            identify a direction that the suspended furniture sways away from the normal position; and
            identify at least one of the plurality of sway control devices whose respective at least one sway line is associated with controlling sway of the suspended furniture along the identified direction; and
        a sway control module including instructions that, when executed by the processor, cause the processor to generate one or more control signals for the identified at least one of the plurality of sway control devices to reduce the rate that the respective at least one sway line is let out as the suspended furniture sways back towards the normal position, and thereby reduce the rate that the suspended furniture sways back towards the normal position.

12. A method of controlling sway of a suspended furniture in a vehicle, comprising:
identifying sway with respect to a normal position of furniture suspended in a vehicle; and
controlling a rate that a respective at least one sway line of a plurality of sway lines is let out from a sway control device to thereby control sway of the suspended furniture.

13. The method of claim 12, wherein the sway control device is an actuatable pulley, and controlling the rate that the respective at least one sway line is let out from the actuatable pulley comprises controlling a rotation rate of the actuatable pulley.

14. The method of claim 12, wherein the sway control device is an adjustable rotary damper, and wherein controlling the rate that the respective at least one sway line is let out from the adjustable rotary damper comprises controlling a damping coefficient for the adjustable rotary damper.

15. The method of claim 12, further comprising:
identifying the respective at least one sway line as being at least one of the plurality of sway lines that retract as the suspended furniture sways away from the normal position.

16. The method of claim 15, wherein controlling the rate that the identified respective at least one sway line is let out from the sway control device comprises controlling the rate that the identified respective at least one sway line is let out from the sway control device in response to the suspended furniture swaying back towards the normal position.

17. The method of claim 12, wherein controlling the rate that the respective at least one sway line is let out from the sway control device comprises reducing the rate that the respective at least one sway line is let out from the sway control device.

18. The method of claim 12, further comprising:
comparing an amount that the suspended furniture sways to a threshold, wherein controlling the rate that the respective at least one sway line is let out from the sway control device is performed responsive to the amount that the suspended furniture sways meeting the threshold.

* * * * *